United States Patent [19]

Tohdo

[11] Patent Number: 5,053,788

[45] Date of Patent: Oct. 1, 1991

[54] METHOD AND APPARATUS FOR THERMAL PRINTING SUITABLE FOR LARGE PRINTING AREA

[76] Inventor: Michiharu Tohdo, 7-34, Miyazaki 6-chome, Miyamae-ku, Kawasaki-shi, Kanagawa-ken, Japan

[21] Appl. No.: 456,808

[22] Filed: Dec. 26, 1989

[30] Foreign Application Priority Data

Dec. 28, 1988 [JP] Japan ............................... 63-334668
Sep. 19, 1989 [JP] Japan ............................... 1-240504

[51] Int. Cl.[5] ......................... G01D 9/00; G01D 15/10

[52] U.S. Cl. ................................ 346/1.1; 346/76 PH; 400/120

[58] Field of Search ........................... 346/1.1, 76 PH; 400/120, 82

[56] References Cited

U.S. PATENT DOCUMENTS 4,740,798 4/1988 Shinoazaki ..................... 346/76 PH
4,860,025 8/1989 Berson et al. .................. 346/76 PH

FOREIGN PATENT DOCUMENTS 0259471 12/1985 Japan .................................... 400/82

*Primary Examiner*—Benjamin R. Fuller
*Assistant Examiner*—Huan Tran
*Attorney, Agent, or Firm*—Marger, Johnson, McCollom & Stolowitz, Inc.

[57] ABSTRACT

A method and an apparatus for thermal printing capable of thermally printing diverse patterns on large printing areas at a high accuracy. In the apparatus, the carbon ribbon is moved along a first track and then along a second track which are spatially separated from the first track; a printing object is carried along the second track below the carbon ribbon; the desired printing patterns are imprinted on the carbon ribbon moving along the first track by a printing head placed on the first track; and the carbon ribbon is pressed onto the printing object by thermal transfer roller placed on the second track so as to thermally transfer the desired printing patterns on the carbon ribbon to the printing object.

20 Claims, 4 Drawing Sheets

METHOD AND APPARATUS FOR THERMAL PRINTING SUITABLE FOR LARGE PRINTING AREA

BACKGROUND OF THE INVENTION

1. Field of the Invention

The present invention relates to a method and an apparatus for thermal printing on a large printing area such as a surface of cardboard, wood, or concrete constituting a part of a box or a container.

2. Description of the Background Art

In general, as a method of printing a limited number of patterns onto a large number of objects uninterruptedly, there is known a method using a stamp.

On the other hand, conventionally, a thermal printing has been utilized in printing on a small printing area, in which the printing is achieved by placing a carbon ribbon over a printing surface and moving a printing head over the carbon ribbon to thermally print desired patterns on the printing surface.

Such a conventional method of thermal printing is known to be associated with the following drawbacks, which has severely limited a practical implementation of an apparatus for thermal printing as well as its fields of applicability.

First of all, the conventional thermal printing is primarily concerned with a printing of a small printing area at a given printing position, so that when such a conventional thermal printing is applied for a printing of diverse patterns on a large area such as a printing of bar codes on a cardboard box, a large size printing apparatus was necessary and a cost of printing increased inevitably.

Secondly, in a conventional thermal printing apparatus, it has structurally not been possible to print patterns with a part of patterns left blank which is to be printed at later time by means of handy type printer for example.

Thirdly, in a conventional apparatus for thermal printing, the imprinting of patterns on the carbon ribbon by the printing head and the thermal printing of the patterns from the carbon ribbon to the printing surface take place at the same position, so that a stability of the printing head with respect to the printing surface is a crucial factor for an accurate printing. Now, in printing a large printing surface such as a cardboard, the printing head has conventionally been supported by a bridge structure bridging over the printing surface. However, such a bridge structure is known to be not stable enough to obtain a sufficient stability for the thermal printing of patterns requiring a high accuracy such as bar codes.

SUMMARY OF THE INVENTION

It is therefore an object of the present invention to provide a method and an apparatus for thermal printing capable of thermally printing diverse patterns on large printing areas at a high accuracy, such that it is possible to print patterns with a part of patterns left blank which is to be printed at later time.

According to one aspect of the present invention there is provided a method of thermally printing desired printing patterns on a printing object by using a carbon ribbon, comprising the steps of: moving the carbon ribbon along a first track and then along a second track which are spatially separated from the first track; carrying a printing object along the second track below the carbon ribbon; imprinting the desired printing patterns on the carbon ribbon on the first track by a printing head means placed on the first track; and pressing the carbon ribbon onto the printing object by thermal transfer roller means placed on the second track so as to thermally transfer the desired printing patterns on the carbon ribbon to the printing object.

According to another aspect of the present invention there is provided an apparatus for thermally printing desired printing patterns on a printing object by using a carbon ribbon, comprising: means for moving the carbon ribbon along a first track and then along a second track which are spatially separated from the first track; conveyer means for carrying a printing object along the second track below the carbon ribbon; printing head means placed on the first track for imprinting the desired printing patterns on the carbon ribbon on the first track; and thermal transfer roller means placed on the second track for pressing the carbon ribbon onto the printing object on the conveyer means so as to thermally transfer the desired printing patterns on the carbon ribbon to the printing object.

Other features and advantages of the present invention will become apparent from the following description taken in conjunction with the accompanying drawings.

DETAILED DESCRIPTION OF THE PREFERRED EMBODIMENTS

Figure 1:
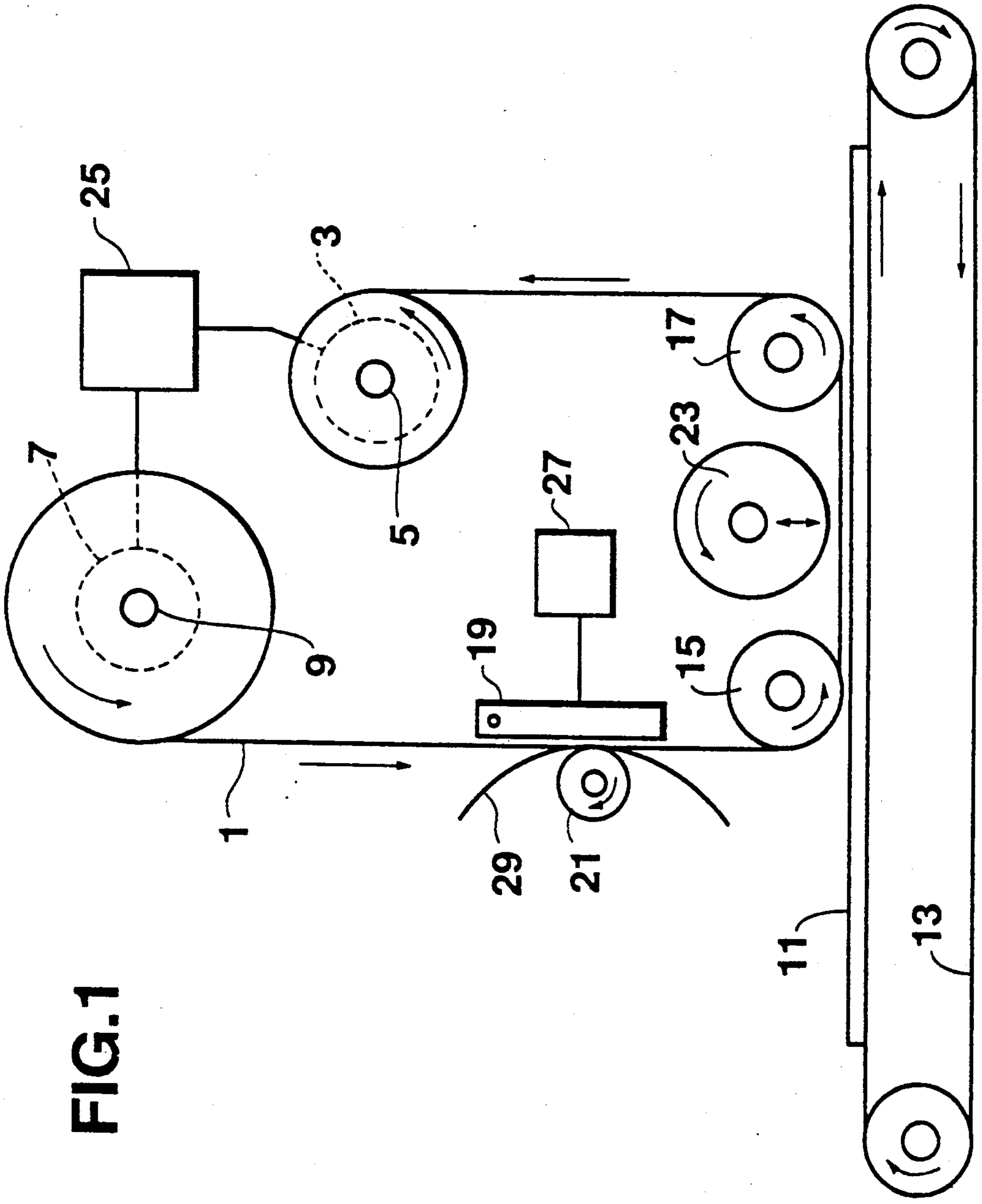
FIG. 1 is a schematic diagram of a first embodiment of an apparatus for thermal printing according to the present invention.

Referring now to FIG. 1, there is shown a first embodiment of an apparatus for thermal printing according to the present invention.

In this first embodiment, there is provided a ribbon winding reel 3, rotatable around an axis 5 which is connected to a motor (not shown), for winding a carbon ribbon 1, and a ribbon supplying reel 7, rotatable around an axis 9 which is connected to another motor (not shown), around which the carbon ribbon 1 is initially wound and from which the carbon ribbon 1 is taken out as it is wound around the ribbon winding reel 3.

The carbon ribbon 1 is suspended downwards from the ribbon winding reel 3 and the ribbon supplying reel 7 in a U-shape by means of a pair of guiding rollers 15 and 17 provided below the ribbon supplying reel 7 and the ribbon winding reel 3, respectively, so that starting from the ribbon supplying reel 7 the carbon ribbon 1 moves along its U-shaped track first along a first vertical track of a sufficient length in a vertical direction and then along a horizontal track of a sufficient length in a horizontal direction before wounded by the ribbon winding reel 3 along a second vertical track.

The carbon ribbon 1 has a front surface covered by carbon blacks which is facing outwards from an outer circumference of the U-shaped track.

At a middle of the first vertical track extending from the ribbon supplying reel 7, there is provided a printing head 19 for imprinting desired patterns on the carbon ribbon 1. This printing head 19 is pivotally supported such that it can be separated away from the carbon ribbon 1, and is controlled by a printing controller unit 27 in which prescribed printing patterns are pre-programmed such that various desired printing patterns can be obtained from combinations of the pre-programmed printing patterns.

On the opposite side of the printing head 19 with respect to the carbon ribbon 1, there is also provided a platen roller 21 for maintaining an accuracy of imprinting by the printing head 19 on the carbon ribbon 1. Between this platen roller 21 and the carbon ribbon 1, a paper 29 is to be inserted on which extraneous negative (or positive) images are transferred by the heat from the printing head 19 so as to leave positive (or negative) images of the printing patterns on the carbon ribbon 1.

Underneath the horizontal track for the carbon ribbon 1, there is provided a belt conveyer 13 on which a printing object 11 is carried along the horizontal direction with a printing surface facing the carbon ribbon 1.

On the opposite side of the belt conveyer 13 with respect to the carbon ribbon 1, between the pair of guiding rollers 15 and 17, there is provided a thermal transfer roller 23 which rotates at such a speed that its circumference moves at the same speed as that of the carbon ribbon 1, and is vertically movable such that at its lowered position the carbon ribbon 1 moving underneath the thermal transfer roller 23 is pressed down on the printing surface of the printing object 11 moving below the carbon ribbon 1 on the belt conveyer 13.

Thus, in this embodiment, the printing head 19 and the thermal transfer roller 23 are arranged to be spatially separated from each other substantially, as they are arrange along the vertical and horizontal directions, respectively. This feature allows this embodiment of an apparatus for thermal printing to print large printing patterns on a large printing surface, since the imprinting by the printing head 19 can be done for the carbon ribbon 1 over a length of the vertical track beyond the printing head 19, while the thermal transfer by the thermal transfer roller 23 takes place at the spatially separated horizontal track.

The ribbon winding reel 3 and the ribbon supplying reel 7 are controlled by a motor controller unit 25 which adjusts timings of activations as well as speeds of the motors connected to the axes 5 and 9 of the ribbon winding reel 3 and the ribbon supplying reel 7, respectively, so as to obtain a smooth and desirably controlled motion of the carbon ribbon 1 along its U-shaped track.

The operation of the thermal printing is performed by this first embodiment of an apparatus for thermal printing as follows.

First, by turning on a switch (not shown) of the apparatus, the carbon ribbon 1 is set into an intermittent motion from the ribbon supplying reel 7 to the ribbon winding reel 3 along its U-shaped track, under the controlling by the motor controller unit 25.

Then, while the carbon ribbon 1 is at rest at the first vertical track, the desired printing patterns are imprinted on the carbon ribbon 1 by the printing head 19 held in a position to make contact with the carbon ribbon 1, under the controlling by the printing controller unit 27. Here, the negative (or positive) images of the printing patterns are formed on the carbon ribbon 1 by means of the heat from the printing head 19 which transfers the extraneous carbon blacks on the carbon ribbon 1 onto the paper 29 such that desired positive (or negative) images of the printing patterns are left on the carbon ribbon 1 as it moves away from the printing head 19.

As the carbon ribbon 1 moves on to the horizontal track, the carbon ribbon 1 carrying the imprinted positive (or negative) images of the printing patterns come into contact with the printing surface of the printing object 11 carried by the conveyer 13, and the carbon ribbon 1 and the printing object 11 moves at the same speed along the horizontal track.

Then, at an appropriate timing the thermal transfer roller 23 is lowered to its lowered position such that the carbon ribbon 1 is pressed onto the printing surface of the printing object 11, so as to have the desired printing patterns printed on the desired locations on the printing surface of the printing object 11.

The printing object 11 is then carried away from the apparatus by the belt conveyer 13, while the carbon ribbon 1 is wound around the ribbon winding reel 3.

Thus, according to this first embodiment, it is possible to thermally print diverse patterns on large printing areas, because the imprinting of the printing patterns on the carbon ribbon 1 by the printing head 19 and the thermal transfer of the printing patterns from the carbon ribbon 1 to the printing object 11 by the thermal transfer roller 23 are performed at spatially separated positions, i.e., on the vertical track and the horizontal track, respectively.

Moreover, the thermal transfer takes place on the printing surface lying on a flat surface of the belt conveyer 13, so that the sufficient stability for achieving a high accuracy required for printing bar codes or other printing patterns requiring a high accuracy.

Furthermore, by adopting this embodiment into a handy type apparatus rather than a fixed type described above, the printing of a part of patterns at later time can easily be furnished.

In addition, in this embodiment, the printing head 19 do not contact with the printing surface of the printing object 11 directly, so that there is no need to make special protection for its logical circuits against the contact with the hard printing surface.

It is to be noted that the printing head 19 and the printing controller unit 27 may be combined into a single controllable printing head.

It is also to be noted that although the thermal printing roller 23 described above is of vertically movable type, this can be replaced by a horizontally movable one which moves along with the carbon ribbon 1 and the printing object 11 in the horizontal direction while pressing the carbon ribbon 1 onto the printing surface of the printing object 11.

Figure 2:
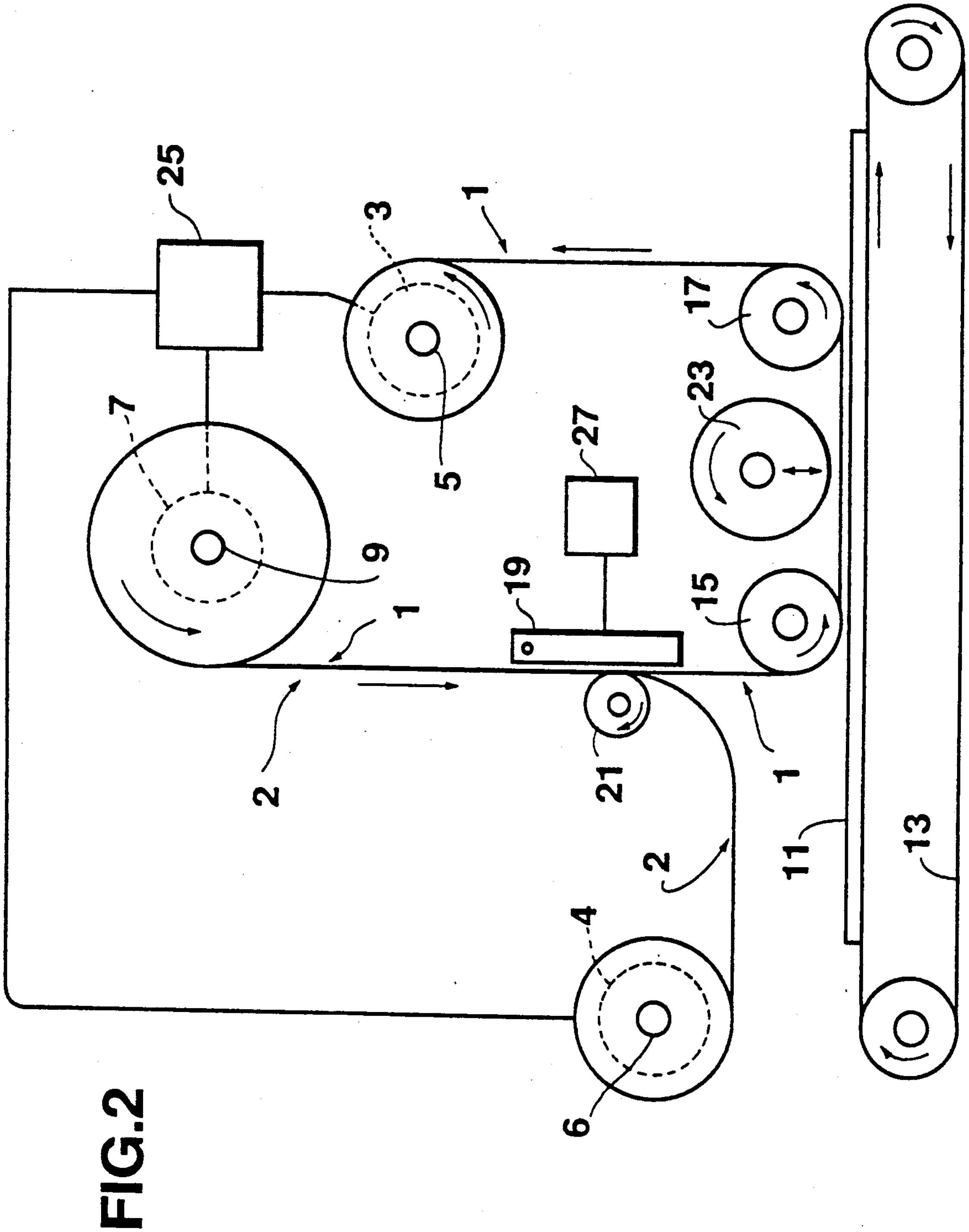
FIG. 2 is a schematic diagram of a second embodiment of an apparatus for thermal printing according to the present invention.

Referring now to FIG. 2, there is shown a second embodiment of an apparatus for thermal printing according to the present invention. Here, those elements having corresponding elements in the first embodiment above are given the same reference numerals in the figures and their descriptions will be omitted.

Figure 3:
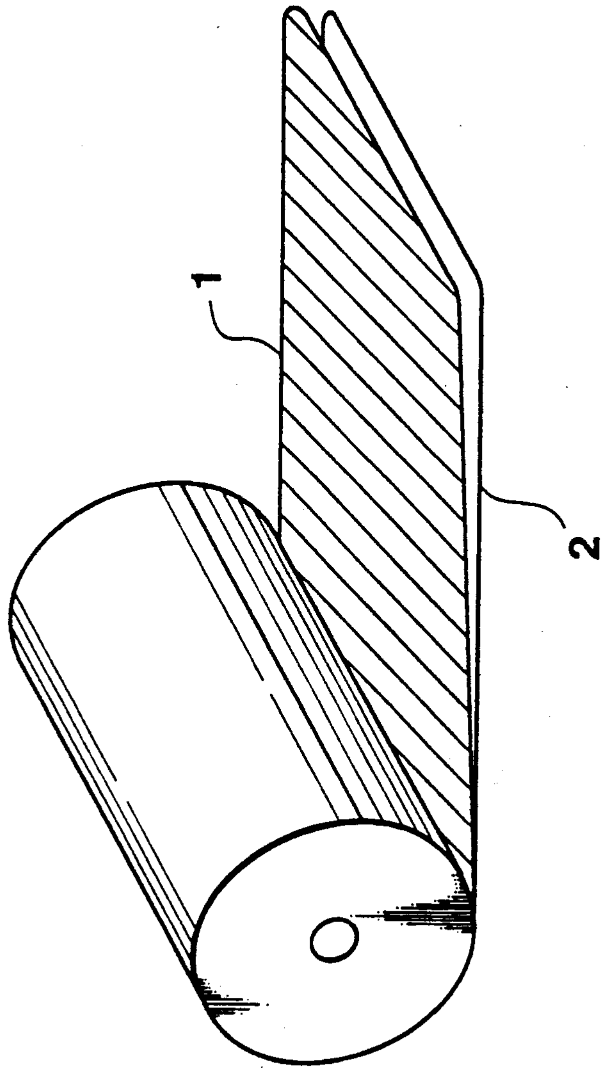
FIG. 3 is a perspective view of a roll of a carbon ribbon and a polyester film to be utilized in the second embodiment of FIG. 2.

In this second embodiment, the carbon ribbon 1 in the first embodiment above is replaced by the carbon ribbon 1 accompanied by a transparent polyester film 2, which are rolled together at the ribbon supply reel 7, as shown in FIG. 3. This polyester film 2 plays a role of the paper 29 in the first embodiment above, i.e., to take extraneous negative (or positive) images of the printing patterns. The polyester film 2 is turned at the platen roller 21 and wound around a film winding reel 4, rotatable around an axis 6 which is connected to a motor (not shown), provided behind the platen roller 21. This film winding reel 4 is also controlled by the motor controller unit 25 along with the ribbon winding reel 3 and the ribbon supplying reel 7.

According to this second embodiment, the supplying of the carbon ribbon 1 and the polyester film 2 are done at the same rate, so that they can be replaced by new ones at the same timing, which in turn secures a continuous operation of the apparatus for the entire length of the carbon ribbon 1.

Figure 4:
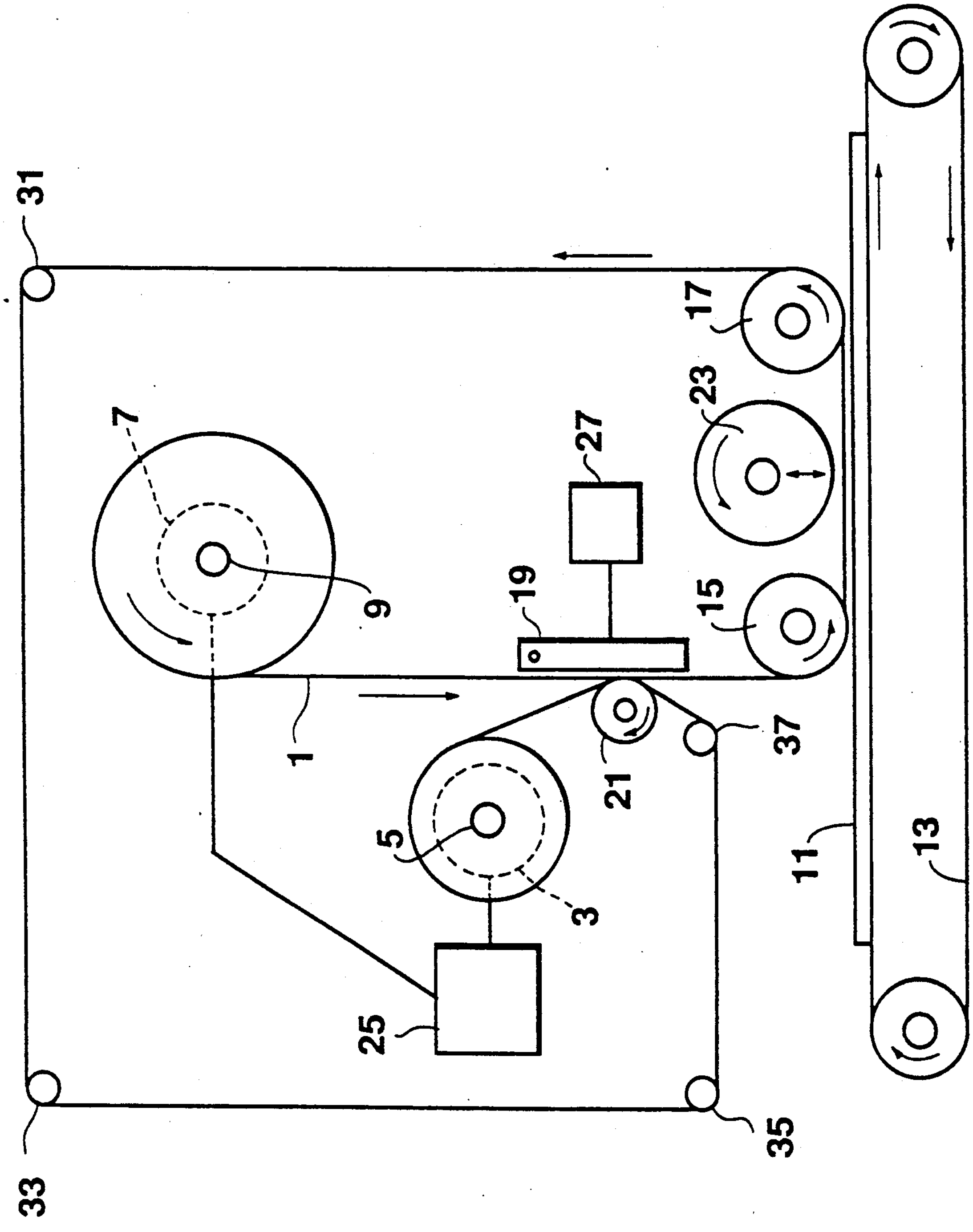
FIG. 4 is a schematic diagram of a third embodiment of an apparatus for thermal printing according to the present invention.

Referring now to FIG. 4, there is shown a third embodiment of an apparatus for thermal printing according to the present invention. Here, those elements having corresponding elements in the first embodiment above are given the same reference numerals in the figures and their descriptions will be omitted.

In this third embodiment, the paper 29 or the polyester film 2 in the first and second embodiments above is replaced by the used carbon ribbon 1 itself. Namely, the carbon ribbon 1 utilized for printing at the first vertical track and the horizontal track is not wound around the ribbon winding reel 3 at the second vertical track, but taken around to be inserted between the platen roller 21 and the carbon ribbon 1 through additional rollers 31, 33, 35, and 37, such that the used carbon ribbon 1 moves in a direction opposite to new carbon ribbon 1 coming from the ribbon supplying reel 7.

This routing is necessary in order to bring the front surface of the used carbon ribbon 1 to face the printing head 19. The front surface of the used carbon ribbon 1 must face the printing head 19 since for the carbon ribbon 1 to be able to receive the carbon blacks it is necessary to have a particular chemical treatment done, and this chemical treatment is usually given to the front surface of the carbon ribbon 1 which is being covered by carbon blacks initially.

The used carbon ribbon 1 is then wound around the ribbon winding reel 3 which is now provided in a vicinity of the platen roller 21.

The used carbon ribbon 1 is usable as the medium to take extraneous negative (or positive) images underneath the printing head 19, because after the printing is performed at the thermal transfer roller 23, all the carbon blacks covering the carbon ribbon 1 are transferred away from the carbon ribbon 1 such that after passing the horizontal track the carbon ribbon 1 is just a transparent sheet.

Thus, according to this third embodiment, the carbon ribbon 1 is used both for printing the desired printing patterns as well as taking extraneous negative (or positive) images when the printing patterns are to be imprinted by the printing head 19, so that no separate medium for taking extraneous negative (or positive) images is required.

It is to be noted that besides those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for thermally printing desired printing patterns on a printing object by using a carbon ribbon, comprising:

means for moving the carbon ribbon along a first track and then along a second track which is spatially separated from the first track;

conveyer means for carrying a printing object along the second track below the carbon ribbon;

printing head means placed on the first track for imprinting the desired printing patterns on the carbon ribbon on the first track;

a platen roller placed on an opposite side of the printing head means with respect to the carbon ribbon;

transparent sheet means for taking extraneous images in which the printing patterns are excluded, the sheet means being a polyester film rolled together with the carbon ribbon which is inserted between the platen roller and the carbon ribbon in a vicinity of the printing head means, and moved along with the carbon ribbon until the carbon ribbon passes through the printing head means; and thermal transfer roller means placed on the second track for pressing the carbon ribbon onto the printing object on the conveyer means so as to thermally transfer the desired printing patterns on the carbon ribbon to the printing object.

2. The apparatus of claim 1, wherein the first and second tracks are oriented along different directions.

3. The apparatus of claim 2, wherein the first and second track are oriented along mutually perpendicular directions.

4. The apparatus of claim 1, wherein the second track is oriented along a horizontal direction.

5. The apparatus of claim 1, wherein the extraneous images are negative extraneous images such that the printing patterns appears blank while an outline of the printing patterns appears inked on the printing object.

6. An apparatus for thermally printing desired printing patterns on a printing object by using a carbon ribbon having carbon black on a carbon black side, comprising:

means for moving the carbon ribbon along a first track and then along a second track which is spatially separated from the first track;

conveyer means for carrying a printing object along the second track below the carbon ribbon;

printing head means placed on the first track for imprinting the desired printing patterns on the carbon ribbon on the first track;

a platen roller placed on an opposite side of the printing head means with respect to the carbon ribbon; and thermal transfer roller means placed on the second track for pressing the carbon ribbon onto the printing object on the conveyer means so as to thermally transfer the desired printing patterns on the carbon ribbon to the printing object; whereby transfer of the printing pattern expends the carbon ribbon; and means for taking extraneous images onto the expended carbon ribbon by inserting the expended carbon ribbon between the platen roller and the carbon black side of the unexpended carbon ribbon in a vicinity of the printing head means such that the extraneous images are placed on the carbon black side of the expended carbon ribbon.

7. The apparatus of claim 6, wherein the first and second tracks are oriented along different directions.

8. The apparatus of claim 7, wherein the first and second tracks are oriented along mutually perpendicular directions.

9. The apparatus of claim 6, wherein the second tracks are oriented along a horizontal direction.

10. The apparatus of claim 6, wherein the extraneous images are negative extraneous images such that the printing patterns appear blank while an outline of the printing patterns appears inked on the printing object.

11. A method of thermally printing desired printing patterns on a printing object by using a carbon ribbon, comprising the steps of:

moving the carbon ribbon along a first track and then along a second track which are spatially separated from the first track;

carrying a printing object along the second track below the carbon ribbon;

imprinting the desired printing patterns on the carbon ribbon on the first track by a printing head means placed on the first track;

providing a platen roller placed on an opposite side of the printing head means with respect to the carbon ribbon;

taking extraneous images in which the printing patterns are excluded, by a transparent sheet means which is a polyester film rolled together with the carbon ribbon, inserted between the platen roller and the carbon ribbon in a vicinity of the printing head means, and moved along with the carbon ribbon until the carbon ribbon passes through the printing head means; and pressing the carbon ribbon onto the printing object by thermal transfer roller means placed on the second track so as to thermally transfer the desired printing patterns on the carbon ribbon to the printing object.

12. The method of claim 11, wherein the first and second tracks are provided along different directions.

13. The method of claim 12, wherein the first and second tracks are provided along mutually perpendicular directions.

14. The method of claim 11, wherein the second tracks are provided along a horizontal direction.

15. The method of claim 11, wherein the extraneous images are negative extraneous images such that the printing patterns appear blank while an outline of the printing patterns appears inked on the printing object.

16. A method of thermally printing desired printing patterns on a printing object by using a carbon ribbon having carbon black on a carbon black side, comprising the steps of:

moving the carbon ribbon along a first track and then along a second track which are spatially separated from the first track;

carrying a printing object along the second track below the carbon ribbon;

imprinting the desired printing patterns on the carbon ribbon on the first track by a printing head means placed on the first track;

providing a platen roller placed on an opposite side of the printing head means with respect to the carbon ribbon;

pressing the carbon ribbon onto the printing object by thermal transfer roller means placed on the second track so as to thermally transfer the desired printing patterns on the carbon ribbon to the printing object, whereby transfer of the printing pattern expends the carbon ribbon; and taking extraneous images in which the printing patterns are excluded, by utilizing the expended carbon ribbon which is inserted between the platen roller and the unexpended carbon ribbon in a vicinity of the printing head means such that the extraneous images are placed on the carbon black side of the expended carbon ribbon.

17. The method of claim 16, wherein the first and second tracks are provided along different directions.

18. The method of claim 17, wherein the first and second tracks are provided along mutually perpendicular directions.

19. The method of claim 16, wherein the second tracks are provided along a horizontal direction.

20. The apparatus of claim 16, wherein the extraneous images are negative extraneous images such that the printing patterns appear blank while an outline of the printing patterns appears inked on the printing object.

* * * * *